Oct. 27, 1931.        J. S. THOMPSON        1,828,791
POSITIONING DEVICE
Filed March 2, 1927
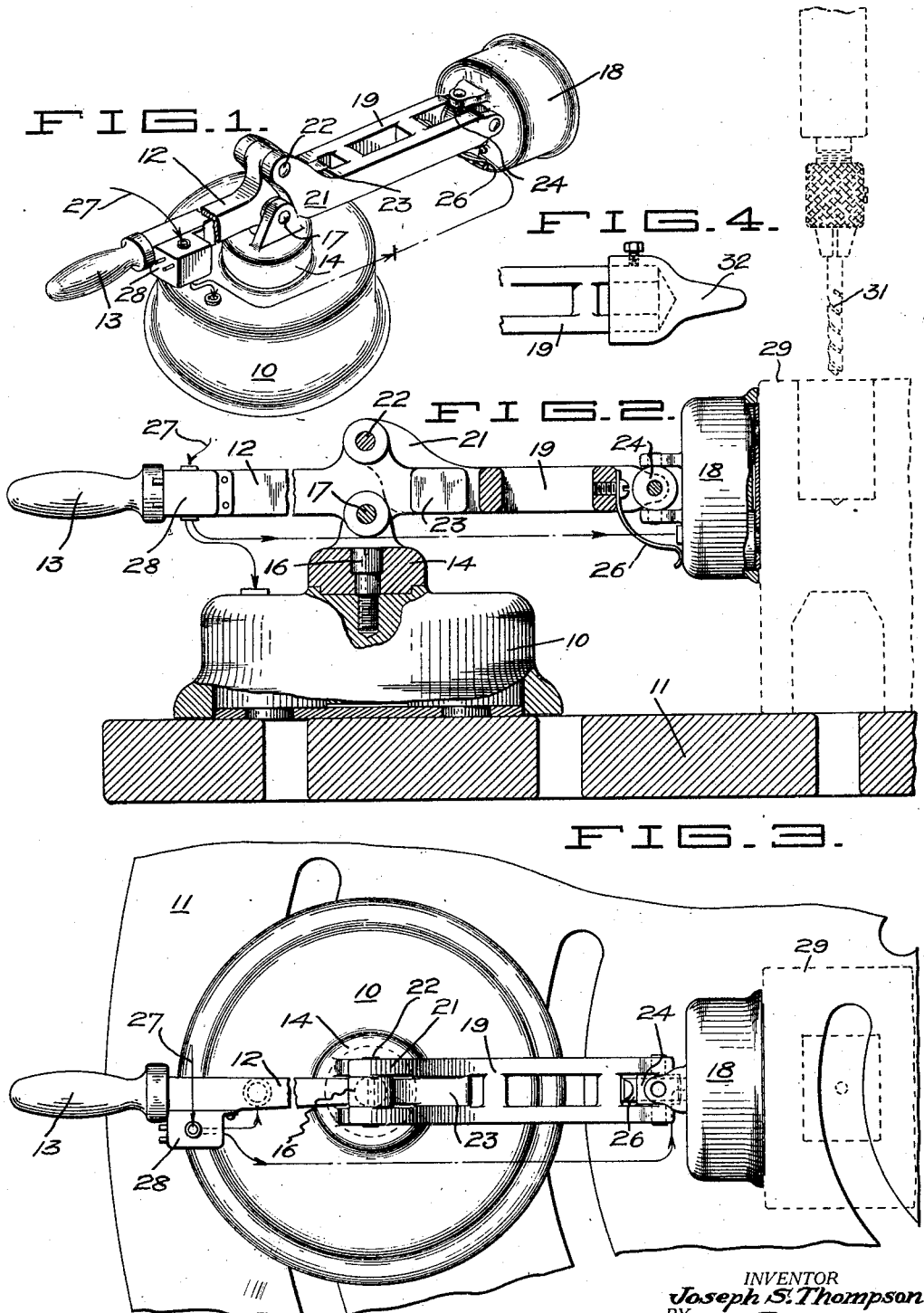
INVENTOR
Joseph S. Thompson
BY White, Prost & Fryer
his ATTORNEYS Patented Oct. 27, 1931

1,828,791

UNITED STATES PATENT OFFICE

JOSEPH S. THOMPSON, OF SAN FRANCISCO, CALIFORNIA

POSITIONING DEVICE

Application filed March 2, 1927. Serial No. 171,974.

This invention relates generally to a tool or device to be used in positioning articles upon machine tool tables.

In operating milling machines, drill presses, planers or other such machine tools, the article to be machined must be accurately set up or positioned upon the tool table. This is usually done by prying or sliding the article upon the table until the desired position is obtained. If the article is a relatively heavy casting this is often a difficult matter since the casting usually moves too far if pushed directly or bumped with the palm of the hand. A great deal of the machinist's time is therefore consumed in the preliminary setting up of the work during which time an expensive machine is idle.

It is an object of this invention to devise a novel mechanical device for sliding articles about upon a tool table in order to readily locate them in the position desired.

It is a further object of this invention to devise a tool for positioning articles upon a machine table which will permit definite and exact movement of the article with a minimum of effort.

It is a further object of this invention to devise a magnetic tool which may be quickly applied or removed from a tool table for positioning articles to be machined.

Further objects of this invention will appear from the following description in which I have set forth the preferred embodiment of my invention. It is to be understood that the appended claims are to be accorded a range of equivalents consistent with the state of the prior art.

Referring to the drawings:

Figure 1 is a perspective view showing the device of this invention.

Fig. 2 is a side elevational view partly in cross section showing the device of this invention applied to a machine tool table.

Fig. 3 is a plan view of the device as shown in Fig. 2.

Fig. 4 is a detail view illustrating a modification of this invention.

The invention consists generally of an electromagnet which serves to removably clamp the device to the usual iron or steel table of a machine tool. Another electromagnet or other tool is provided for engaging the article to be positioned, and interconnecting the two magnets there is a suitable mechanical mechanism whereby the article engaging electromagnet may be moved relative to the table or support. Generally this mechanism is in the form of a manually operable system of levers whereby universal movement of the article engaging electromagnet may be secured.

In the embodiment of the invention illustrated in the drawing there is provided an electromagnet 10 which is adapted to magnetically clamp upon the top surface of the usual iron or steel tool table 11. Pivotally mounted upon this electromagnet there is a hand lever 12 provided with a suitable hand grip 13. This hand lever 12 is preferably connected to electromagnet 10 in such a manner that it may be swung in any direction, in other words it is provided with a universal connection. A satisfactory form of mounting may consist for example of a bifurcated member 14 which is pivotally mounted upon electromagnet 10 as by means of pin 16, so that it may be rotated around an axis normal to the top of table 11. Hand lever 12 is pivotally secured to member 13 by means of pin 17, so that it may move about an axis substantially at right angles to the axis of pivot pin 16.

Interconnecting the hand lever 12 and an article engaging member 18 there is an arm 19 one end of which is provided with a forked portion 21 which is pivotally secured to hand lever 12 as by means of pivot pin 22. The axis of pivot pins 17 and 22 are substantially parallel and are spaced apart vertically so that up and down movement of hand lever 12 serves to shift the arm 19 longitudinally, or in general direction of the plane of the table 11. In order to aid in shifting arm 19 laterally, hand lever 12 is provided with a portion 23 which projects between the forked portion 21.

The article engaging member 18 is also preferably an electromagnet which is secured to the outer end of arm 19 as by means of suitable connection 24 which may be universal as shown so as to permit the electromagnet 18 to swing either in a vertical or horizontal direction. A resilient spring 26 may be provided to normally retain the magnet 18 in operable position. In practice both electromagnets are energized from a common source of current supplied through the flexible conductor cord 27. The current to both magnets is controlled by suitable means such as a switch 28 which is mounted upon hand lever 12 in proximity to the hand grip 13.

In operating the device, if for example it is desired to accurately locate the iron or steel casting 29 for drilling a hole with the drill 31, the electromagnet 10 is positioned upon the table 11 in proximity to the casting 29 and electromagnet 18 is brought against one face thereof. The magnets are then energized by operating switch 28, thus causing magnet 10 to tightly clamp the device to the table top and magnet 18 to grip the casting 29. Because of the leverage provided, relatively large up and down movement of hand lever 12 will effect a very slight sliding movement of the article 29 thus making it possible to move the article an exact amount. The casting may also be shifted in other directions upon the table top by lateral movement of the hand lever.

In case the articles to be machined are not made of para-magnetic material another form of article engaging member must be substituted in place of the electromagnet 18. For example this member may be made in the form of a hook or clamp for positively engaging the casting, or it may be simply a form of abutment member 32 as shown in Fig. 4, this abutment member being secured to the outer end of arm 19. This abutment member gives good results since in practice accurate positioning of the article may be obtained if it is possible to secure exact movement of the article in one direction.

One of the most important features of this invention is the ease with which it may be shifted about from one position to another or from one machine table to another merely by operation of switch 28. Furthermore it is relatively universal in its application being adaptable to a variety of machine tools and to castings of different shapes and sizes.

I claim:

1. A device for positioning articles comprising an electromagnet adapted to be magnetically clamped against a fixed support, another electromagnet adapted to be clamped to an article to be positioned, and mechanism interconnecting said electromagnets for effecting relative movement between the other magnet and the fixed support.

2. A device for positioning articles comprising an electromagnet adapted to be magnetically clamped against a fixed support, another electromagnet adapted to be clamped to an article to be positioned, and mechanism interconnecting said electromagnets for effecting universal relative movement between the other magnet and the fixed support.

3. In a portable positioning device of the character described, two electromagnets, a bell crank connected to one of said electromagnets, a link pivotally secured at one of its ends to one arm of said bell crank and a universal joint connecting the other end of said link with the other of said electromagnets.

4. A device for holding and positioning work upon a machine table comprising a holding magnet adapted to be clamped against a fixed support, a second work engaging magnet, and means interconnecting said magnets for adjustably moving the work engaging magnet with respect to the support in the same general direction as the plane of the table.

5. In a device of the character described, an electromagnet for holding the device at a fixed point in a support, a second magnet movable with respect to the first magnet, and manually operable means interconnecting the magnets providing for movement of the second magnet with respect to the first magnet, said means including a bell crank fixed to one of the magnets and a link and universal joint connection between the bell crank and the other magnet.

In testimony whereof I have hereunto set my hand.

JOSEPH S. THOMPSON.